United States Patent [19]

Takano et al.

[11] Patent Number: 5,077,458

[45] Date of Patent: Dec. 31, 1991

[54] RESISTANCE WELDING APPARATUS WITH GUN-ARM MOUNTED TRANSFORMER

[75] Inventors: Fumitomo Takano; Makoto Suzuki; Gen Tsujii; Nobuo Kobayashi; Toshihiro Murakawa, all of Sayama, Japan

[73] Assignee: Honda Giken Kogyo Kabushiki Kaisha, Tokyo, Japan

[21] Appl. No.: 449,812

[22] Filed: Dec. 13, 1989

[30] Foreign Application Priority Data

Dec. 15, 1988 [JP] Japan ............................. 63-317378
Feb. 9, 1989 [JP] Japan ............................. 1-15202[U]
Feb. 9, 1989 [JP] Japan ............................. 1-32399
Feb. 9, 1989 [JP] Japan ............................. 1-32400

[51] Int. Cl.⁵ ............................................ B23K 11/24
[52] U.S. Cl. ................................... 219/116; 219/108
[58] Field of Search .............. 219/116, 108, 86.25; 336/210

[56] References Cited

U.S. PATENT DOCUMENTS 4,485,289 11/1984 Schwartz ........................... 219/116
4,496,821 1/1985 Burgher et al. ..................... 219/116
4,559,438 12/1985 Nakadate et al. ................... 219/116
4,577,085 3/1986 Burgher et al. ..................... 219/116
4,789,849 12/1988 Ballard et al. ...................... 336/210

FOREIGN PATENT DOCUMENTS 60-180683 9/1985 Japan ................................. 219/116
646250 11/1950 United Kingdom .
724237 2/1955 United Kingdom .
1075872 7/1967 United Kingdom .
1555528 11/1979 United Kingdom .

Primary Examiner—Clifford C. Shaw

[57] ABSTRACT

A resistance welding apparatus mounted on a robot arm includes a transformer having primary and secondary windings. Two gun arms supporting respective welding electrodes in confronting relation to each other are relatively movable toward and away from each other. Conductors extending from the secondary winding are electrically connected to one of the welding electrodes through one of the gun arms, and the transformer is supported on said one gun arm. Rectifiers are used which have terminals engaging said one gun arm and opposite terminals engaging the conductors. The rectifiers and the conductors are securely joined to the one gun arm.

27 Claims, 10 Drawing Sheets

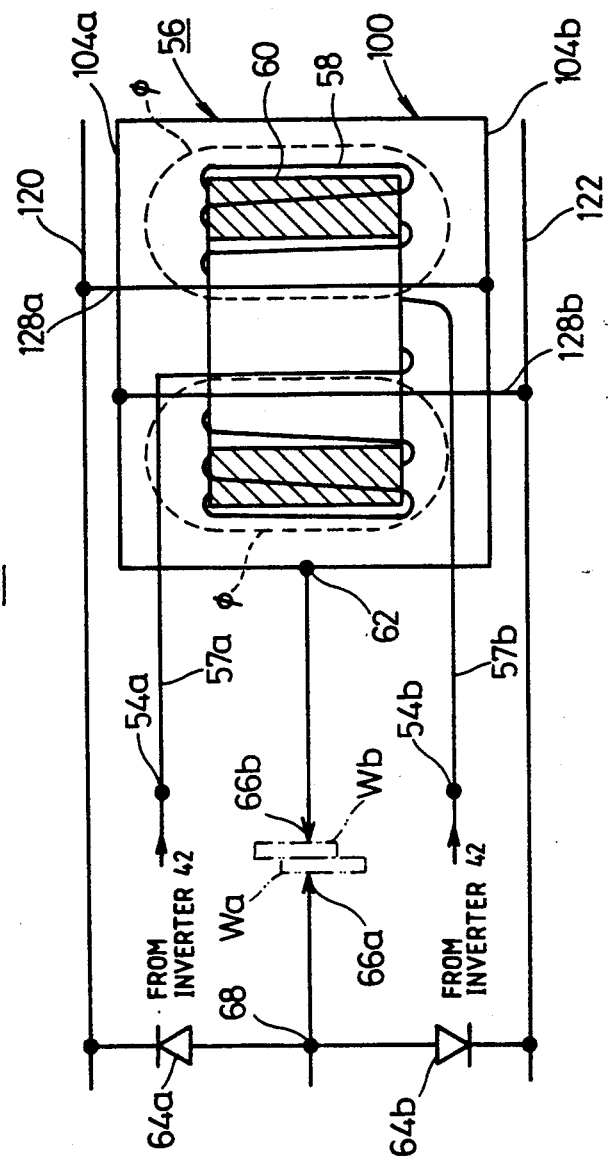

RESISTANCE WELDING APPARATUS WITH GUN-ARM MOUNTED TRANSFORMER

BACKGROUND OF THE INVENTION

1. Field of the Invention

The present invention relates to a resistance welding apparatus for supplying a welding current between two electrodes mounted on respective gun arms to weld workpieces clamped between the electrodes.

Resistance welding apparatus are widely employed to weld workpieces in shops and factories. A resistance welding apparatus has a pair of electrodes movable toward and away from each other. The electrodes which clamp workpieces therebetween are supplied with a welding current to fuse and weld the workpieces to each other.

2. Description of Background Art

One resistance welding apparatus includes an apparatus housing floatingly supported by a support bracket on which a transformer is fixedly mounted. The transformer has a secondary winding whose ends are connected to ends of terminal plates. The other ends of the terminals are electrically connected to two gun arms supporting respective electrodes through flexible copper plates. The flexible copper plates however present a contact resistance which results in an electric power loss and impose limitations on the direction in which the apparatus housing can be installed. The resistance welding apparatus is also heavy and large since the transformer is fixed to the support bracket through dedicated holders.

There has been proposed a resistance welding apparatus which includes an apparatus housing floatingly supported by a support bracket and a transformer fixedly mounted on the apparatus housing, with one terminal plate of the transformer being directly coupled to one gun arm (see Japanese Laid-Open Utility Model Publication No. 60(1985)-141977). The proposed structure reduces any electric power loss and the overall weight of the resistance welding apparatus, and also allows the apparatus housing to be installed in any desired direction.

Efforts have been made in recent years to mount a resistance welding apparatus on robot arms for automatizing welding operation. Therefore, there are demands for smaller and lighter resistance welding apparatuses.

Other resistance welding apparatuses which find wise use today include first conductive plates connected respectively to the ends of the secondary winding of the transformer, rectifiers and second conductive plates attached to the first conductive plates in superposed fashion, and gun arms connected to the second conductive plates through respective flexible copper plates.

However, a large electric power loss is caused by joints between the second conductive plates connected to the rectifiers and the flexible copper plates and also between the flexible copper plates and the gun arms, and also by the internal resistance of the flexible copper plates. If a relative large welding current is required as when welding thick plates or plated steel plates in particular, then since a large electric power loss would result from the contact resistance and the internal resistance, a large welding current cannot be supplied efficiently to the electrodes.

At the time a relatively large current is supplied to weld thick plates or plated steel plates, the electrodes and the rectifiers themselves are heated to a considerably high temperature. Accordingly, various cooling means are employed to cool the electrodes and the rectifiers in order to avoid adverse effects which such a high temperature would have on the electrodes and the rectifiers.

The cooling means are generally used exclusively to cool the electrodes or the rectifiers. Consequently, as many cooling means as the number of the electrodes and the rectifiers to be cooled must be employed in reality. Since such a number of cooling means need to be incorporated in the resistance welding apparatus, the resistance welding apparatus is large and heavy and highly costly.

In an attempt to reduce the size of a transformer in a resistance welding apparatus, it has been proposed to use a toroidal core as a transformer core and also to design a secondary winding as a container.

FIG. 1 of the accompanying drawings shows a conventional transformer 2 disclosed in Japanese Patent Publication No. 52(1977)-208, the transformer 2 having a secondary winding doubling as a container. The transformer 2 includes a hollow outer conductor 4, a bottom conductor 8 fixed to the lower end of the outer conductor 4, and a rodshaped inner conductor 10 extending upwardly from the center of the bottom conductor 8 and serving as a terminal conductor. A toroidal core 14 with a primary winding 12 mounted thereon is disposed around the inner conductor 10 within the outer conductor 4. A cover conductor 18 is mounted on the upper end of the outer conductor 4 and has a hole 16 through which the inner conductor 10 extends. A rod-shaped terminal conductor 20 is fixed to the cover conductor 18. The cover conductor 20 has two holes (not shown) through which lead-out wires of the primary winding 12 extend out of the transformer container.

The electric circuit of the transformer 2 thus mechanically constructed is shown in FIG. 2. The primary winding 12 mounted on the toroidal core 14 has X turns, and the secondary winding which is composed of the inner conductor 10, the bottom conductor 8, the outer conductor 4, and the cover conductor 18 has a single turn. Therefore, the transformer 2 has a transformation ratio of X : 1.

The rectifier circuit of the resistance welding apparatus is normally a full-wave rectifier circuit for higher efficiency and smaller ripple. The electric circuit of the transformer 2 shown in FIG. 2 may be associated with a single-phase full-wave bridge rectifier circuit, as shown in FIG. 3, having rectifiers 22a through 22d connected in a bridge. The single-phase full-wave bridge rectifier circuit however has twice as many rectifiers as those of a singlephase full-wave center-tap rectifier circuit. Accordingly, the rectifier circuit of the transformer 2 is large in size and complex in construction.

The toroidal core 14 is made of silicon steel or ferrite. However, the loss caused by the toroidal core 14 is increased even if the transformer 2 is employed in a resistance welding apparatus of the inverter type in which a direct current is converted to a high-frequency alternating current that is supplied to the transformer so as to be lowered in voltage, and the alternating current is converted again back to a direct current by the rectifiers. The cross-sectional area of the toroidal core cannot therefore be reduced, and the transformer cannot be sufficiently reduced in size and weight.

SUMMARY OF THE INVENTION

It is a primary object of the present invention to provide a resistance welding apparatus which can reduce electric power loss and which is lighter in weight and smaller in size.

Another object of the present invention is to provide a resistance welding apparatus including a transformer having a secondary winding, a pair of gun arms supporting respective welding electrodes in confronting relation to each other and movable toward and away from each other, and a conductor extending from said secondary winding and electrically connected to one of said welding electrodes through one of said gun arms, said transformer being supported on said one gun arm.

Still another object of the present invention is to further provide the resistance welding apparatus with a rectifier having a terminal engaging said one gun arm and an opposite terminal engaging said conductor, said rectifier and said conductor being securely joined to said one gun arm.

Yet another object of the present invention is to further provide the resistance welding apparatus with a reinforcing member of an electrically insulating material attached to said conductor, said transformer being supported on said one gun arm through said conductor and said reinforcing member.

Yet still another object of the present invention is to further provide the resistance welding apparatus with a robot arm, a bracket mounted on said robot arm, an actuator for displacing the other gun arm with respect to said one gun arm, said transformer and said gun arms being combined as an assembly which is foatingly supported by said bracket.

A further object of the present invention is to provide a resistance welding apparatus including a transformer having a secondary winding, a plurality of rectifiers connected to said secondary winding, a pair of gun arms supporting respective welding electrodes in confronting relation to each other and movable toward and away from each other, and said rectifiers being held in direct engagement with one of said gun arms.

A still further object of the present invention is to construct the resistance welding apparatus wherein said rectifiers include first and second rectifiers having terminals held against respective sides of said one gun arm, further including first and second conductors extending from said secondary winding and held against the opposite terminals of said first and second rectifiers, said first and second rectifiers and said first and second conductors being securely coupled to each other.

A yet further object of the present invention is to further provide the resistance welding apparatus with a robot arm, a bracket mounted on said robot arm, an actuator for displacing the other gun arm with respect to said one gun arm, said transformer and said gun arms being combined as an assembly which is floatingly supported by said bracket.

It is also an object of the present invention to provide a resistance welding apparatus including a transformer having a secondary winding, a rectifier connected to said secondary winding, a pair of gun arms supporting respective welding electrodes in confronting relation to each other and movable toward and away from each other, said rectifier being held in direct engagement with one of said gun arms, and a coolant passage defined in said one gun arm and extending near said welding electrode supported by said one gun arm and near said rectifier, for passing a coolant therethrough to cool said electrode and said rectifier.

Another object of the present invention is to further provide the resistance welding apparatus with a conductor extending from said secondary winding and held in direct engagement with said rectifier, said conductor having a coolant passage defined therein for passing a coolant therethrough to cool the interior of said transformer and said rectifier.

Still another object of the present invention is to provide a resistance welding apparatus including a transformer having a hollow conductive container serving as a secondary winding, an annular core disposed in said container, and a primary winding mounted on said annular core, a rectifier having one terminal held against said container, an output terminal connected to the other terminal of said rectifier, and a center tap mounted on an outer side wall of said container, whereby a welding current can be supplied from said output terminal and said center tap to workpieces to be welded to each other.

Yet another object of the present invention is to construct the resistance welding apparatus above wherein said container is filled with insulating oil.

Yet still another object of the present invention is to construct the resistance welding apparatus above wherein said container has a coolant passage defined therein.

Yet another object of the present invention is to construct the resistance welding apparatus above wherein said core is made of an amorphous material.

A further object of the present invention is to provide a resistance welding apparatus including a transformer having a hollow conductive container serving as a secondary winding, an annular core disposed in said container, and a primary winding mounted on said annular core, first and second inner conductors extending through the interior space of said core and electrically connected to said container, first and second flat conductors extending parallel to each other, said first and second inner conductors having ends embedded in confronting surfaces of said first and second flat conductors, and extending in opposite directions, first and second rectifiers having terminals held against said first and second flat conductors, respectively, an output terminal connected to the other terminals of said first and second rectifiers, and a center tap mounted on said container, whereby a welding current can be supplied from said output terminal and said center tap to workpieces to be welded to each other.

Further scope of applicability of the present invention will become apparent form the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will become more apparent from the following description when taken in conjunction with the accompanying drawings in which a preferred embodiments of the present invention are shown by way of illustration only, and thus are not limitative of the present invention, and wherein:

FIG. 12 is a circuit diagram of the transformer.

DETAILED DESCRIPTION OF THE PREFERRED EMBODIMENT

Figure 1:
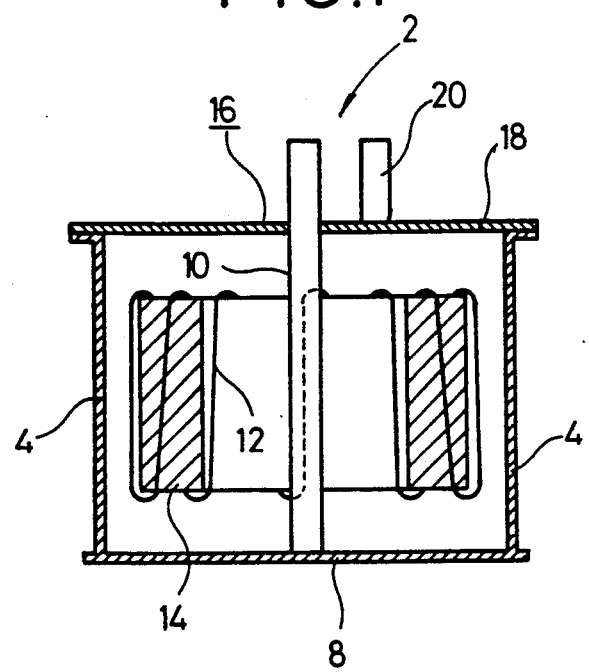
FIGS. 1 through 3 show a conventional transformer.
Figure 2:
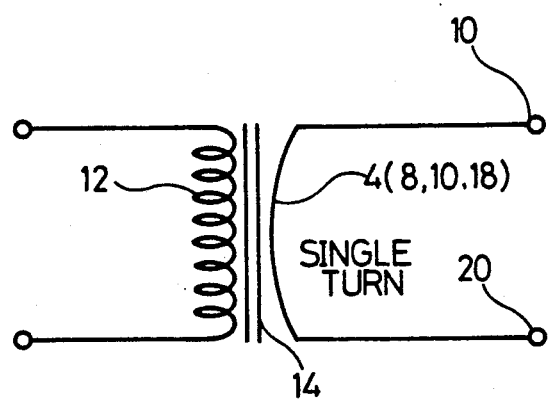
Figure 3:
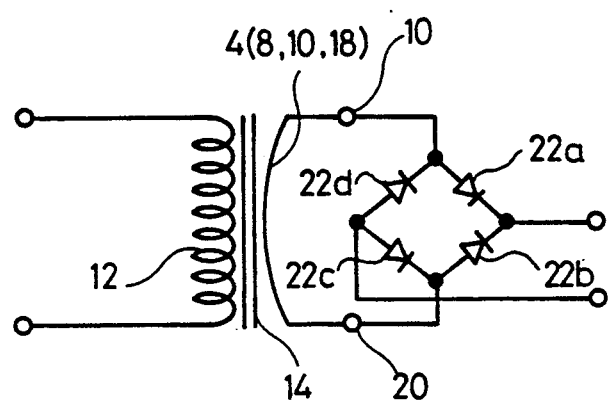
Figure 4:
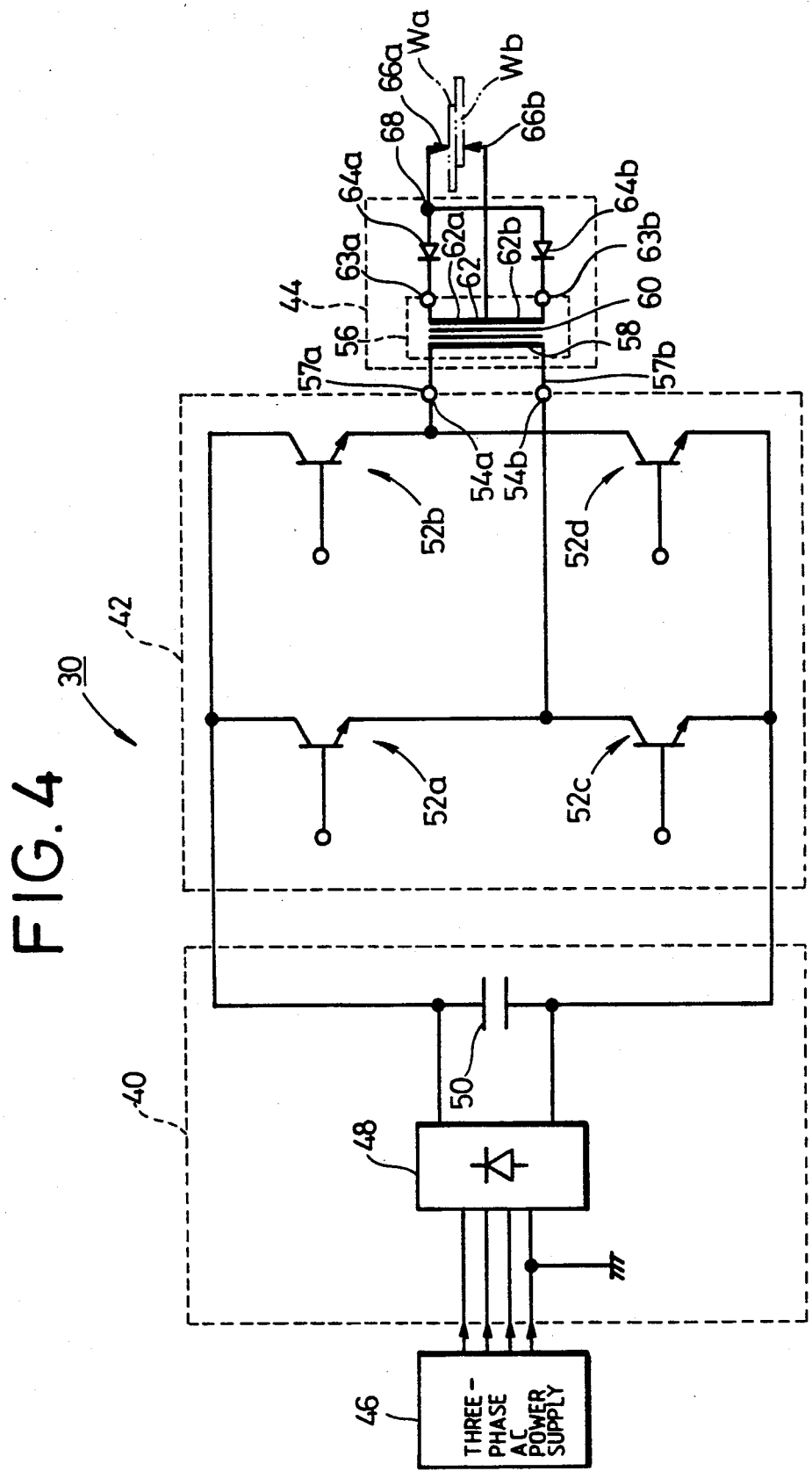
FIG. 4 is an electric circuit of a resistance welding apparatus according to the present invention.

FIG. 4 schematically shows a resistance welding apparatus 30 according to the present invention. The resistance welding apparatus 30 basically comprises a converter unit 40, an inverter unit 42, and a transformer unit 44 with rectifiers.

Three-phase AC electric power supplied from a commercial three-phase AC power supply 46 is converted to DC electric power by a rectifier stack 48 and a capacitor 50 of the converter unit 40. The DC electric power is then converted to AC electric power having a higher frequency, e.g., of 10 KHz, than that of the three-phase AC electric power from the power supply 46 by the inverter unit 42 of the full-bridge configuration that is composed of transistors 52a through 52d.

The high-frequency AC electric power from the inverter unit 42 is supplied to a primary winding 58 of a transformer 56 of the transformer unit 44 through lead-out wires 57a, 57b connected to output terminals 54a, 54b of the inverter unit 42. The primary winding 58 is wound on a core 60 made of an amorphous material. When the high-frequency AC electric power is applied to the primary winding 58, an output voltage is induced across secondary windings 62a, 62b of the transformer 56 between output terminals 63a, 63b thereof. The transformer 56 has a center tap 62 between the secondary windings 62a, 62b. The output voltage from the transformer 56 is converted back to DC electric power by rectifiers 64a, 64b of a single-phase full-wave center-tap rectifier circuit, and the converted DC electric power is supplied to welding electrodes 66a, 66b between which workpieces Wa, Wb are clamped. The welding electrode 66a is connected to a common output terminal 68 of the rectifiers 64a, 64b, whereas the welding electrode 66b is connected to the center tap 62 between the secondary windings 62a, 62b.

Figure 5:
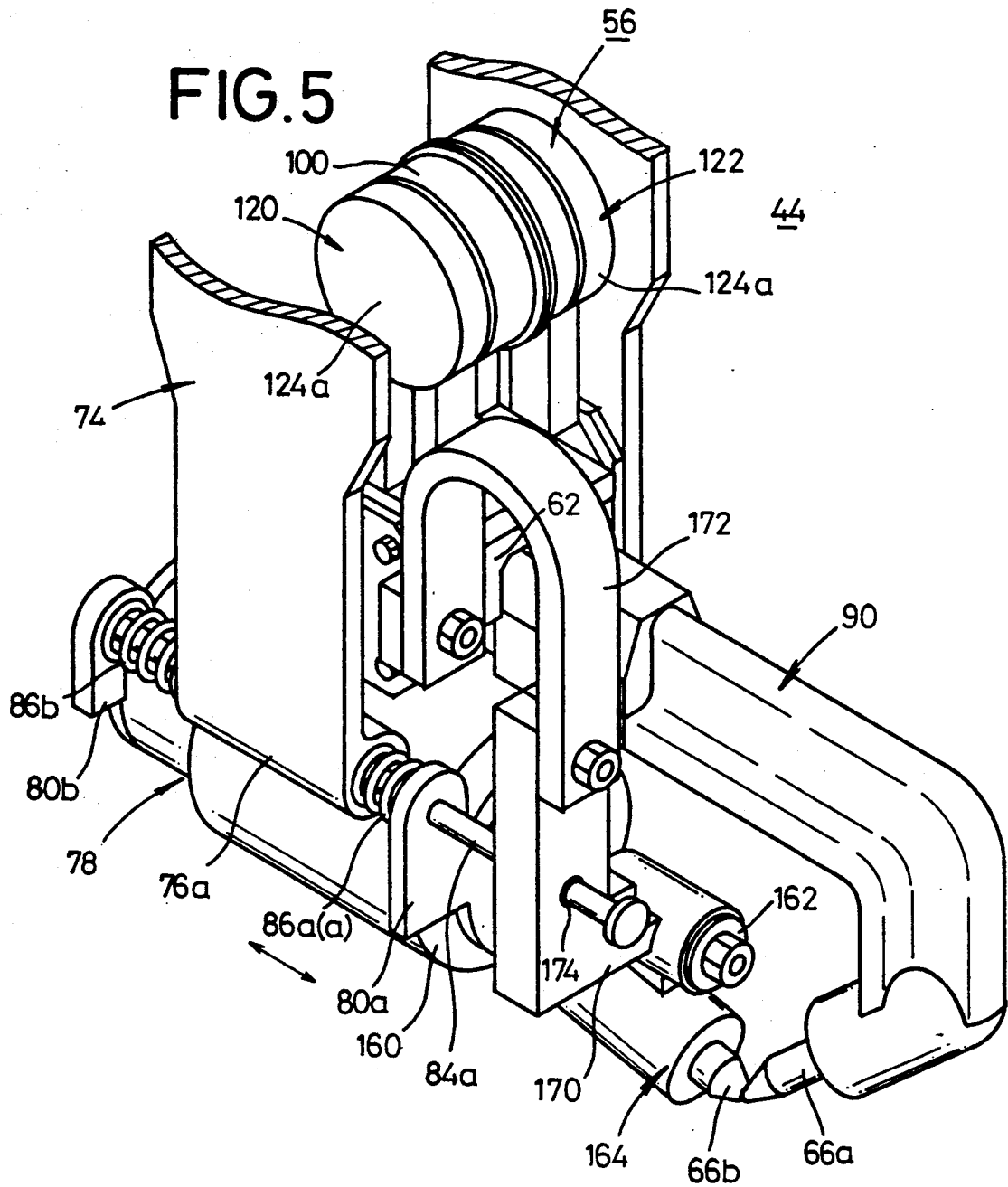
FIG. 5 is a perspective view of a transformer with rectifiers in the resistance welding apparatus shown in FIG. 4.
Figure 6:
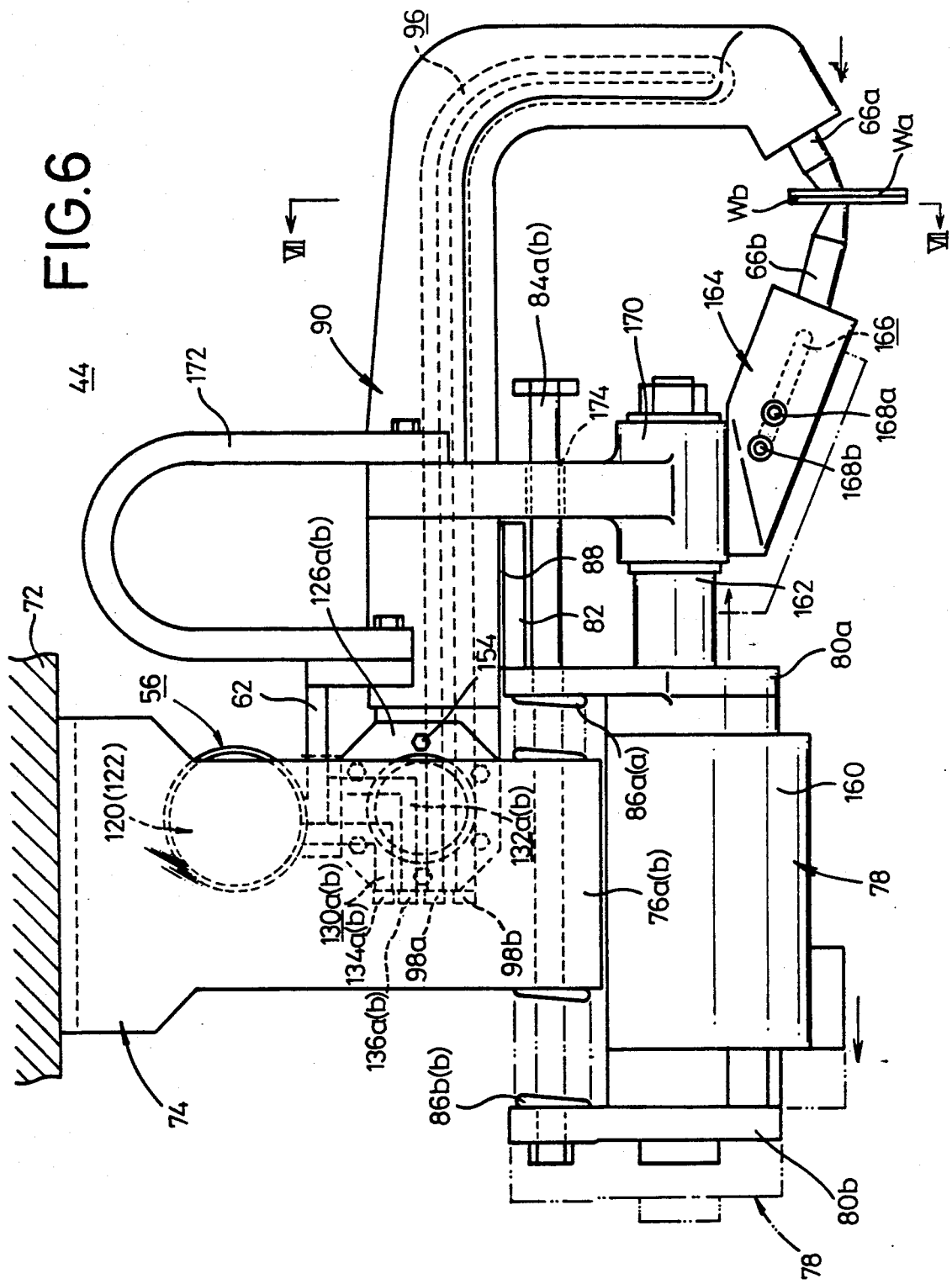
FIG. 6 is a side elevational view, partly in cross section, of the transformer shown in FIG. 5.
Figure 7:
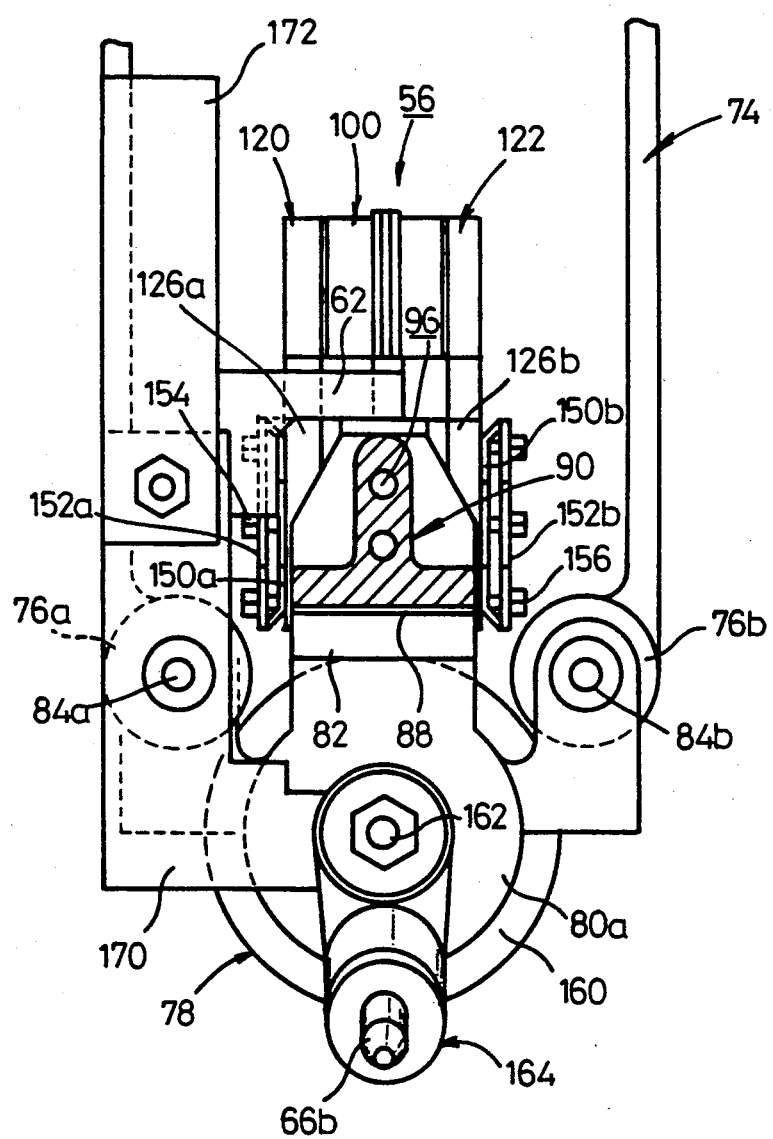
FIG. 7 is a cross-sectional view taken along line VII—VII of FIG. 6.

As shown in FIGS. 5 through 7, the transformer unit 44, the welding electrodes 66a, 66b, and those members which are interposed therebetween are supported as an assembly 78 by a support bracket 74 fixed to the distal end of a robot arm 72 of a welding robot. The support bracket 74 has an upper channel-shaped portion including two parallel legs extending downwardly and having respective tubular members 76a, 76b on lower ends thereof. The assembly 78 is floatingly supported by the support bracket 74 through the tubular members 76a, 76b.

The assembly 78 includes a pair of holder plates 80a, 80b fixed respectively to the opposite ends of a cylinder 160, the holder plate 80a having on its upper end an attachment 82 bent through about 90° and extending horizontally. Relatively long guide bars 84a, 84b extend through and are supported by the holder plates 80a, 80b. The guide bars 84a, 84b are fitted in the respective tubular members 76a, 76b. Two coil springs 86a, 86b are disposed around the guide bar 84a between the holder plates 80a, 80b and the tubular member 76a, and two coil springs 86a, 86b are similarly disposed around the guide bar 84b between the holder plates 80a, 80b and the tubular member 76b.

A fixed gun arm 90 is attached to the attachment 82 of the holder plate 80a through an insulation plate 88. The fixed gun arm 90 includes a horizontal portion mounted at one end on the attachment 82 and a downward portion extending downwardly from the other end of the horizontal portion. A welding electrode 66a is installed on the lower end of the downward portion of the fixed gun arm 90. A planar output terminal 68 (see FIGS. 8 and 9) is attached to said one end of the horizontal portion of the fixed gun arm 90. The fixed gun arm 90 has a coolant passage 96 defined therein and extending to a position near the welding electrode 66a, the coolant passage 96 having opposite ends opening outwardly in the output terminal 68. Nipples 98a, 98b are attached to the open ends of the coolant passage 96, and connected to pipes 99a, 99b, respectively, extending from a coolant supply source (not shown).

Figure 10:
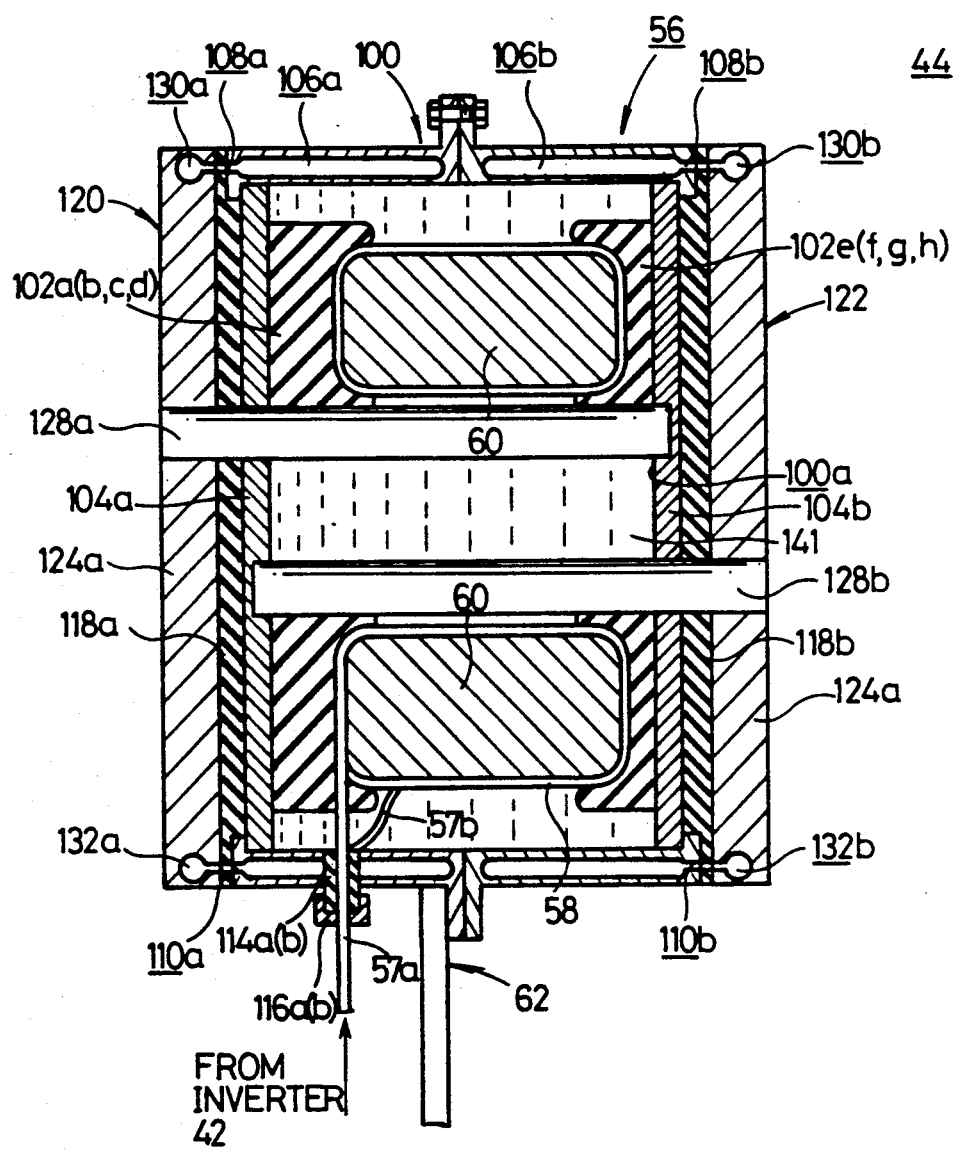
FIG. 10 is a cross-sectional view of the transformer.
Figure 11:
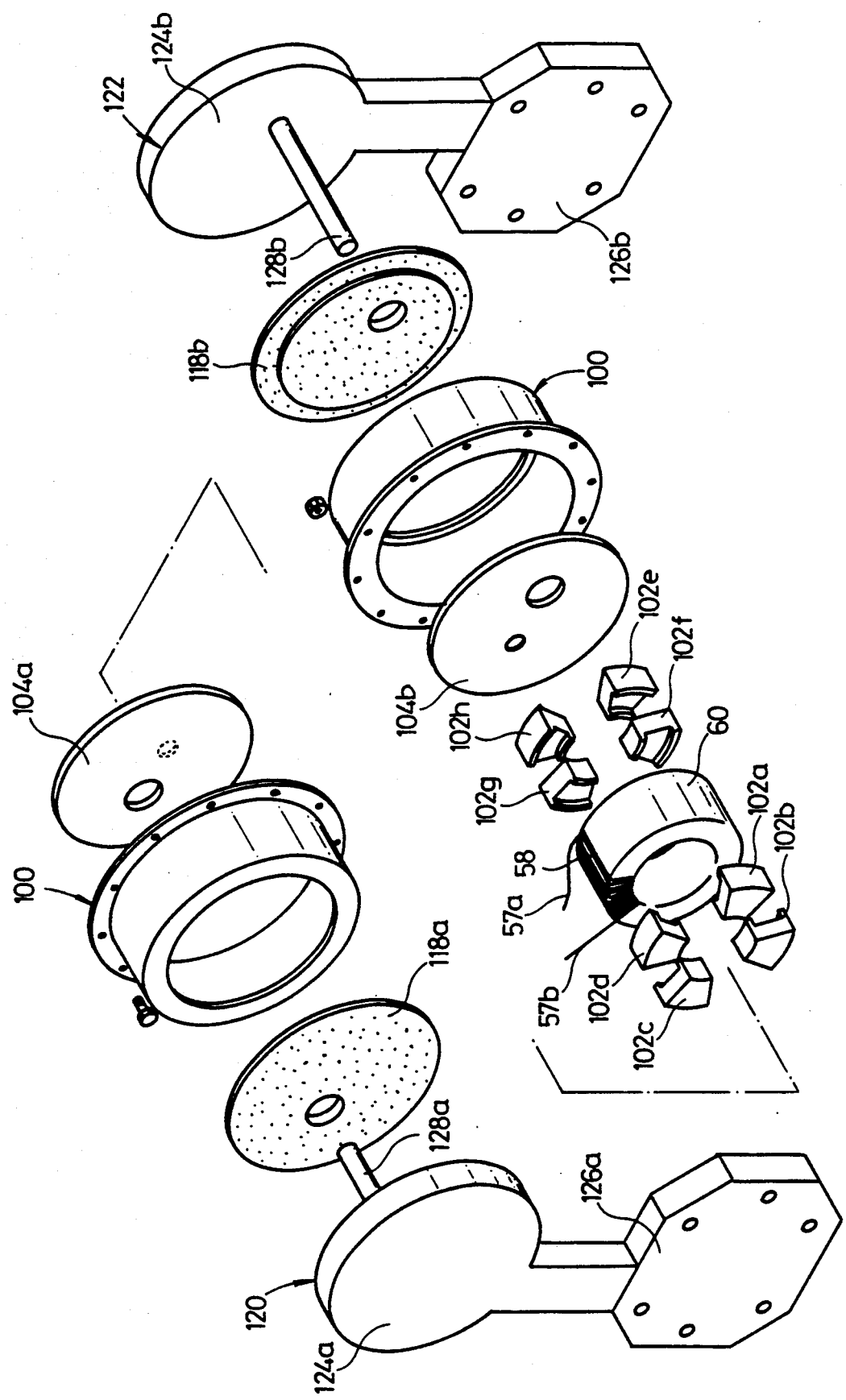
FIG. 11 is an exploded perspective view of the transformer.

As illustrated in FIGS. 10 and 11, the transformer 56 has a separable hollow cylindrical conductive container 100 in which the annular or toroidal core 60 with the primary winding 58 wound thereon is disposed. Packings 102a through 102h of an insulating material are held against the opposite axial ends of the core 60. The packings 102a through 102h are supported by conductive support plates 104a, 104b of the container 100. The container 100 has cooling water passageways 106a, 106b defined in its side wall and communicating with inlet ports 108a, 108b and outlet ports 110a, 110b.

The side wall of the container 100 also has primary winding outlet holes 116a, 116b fitted with tubular insulating members 114a, 114b, respectively. The lead-out wires 57a, 57b of the primary winding 58 extend out through the outlet holes 116a, 116b, and are connected to the output terminals 54a, 54b of the inverter unit 42. One end of the center tap 62 is connected to a joint on the side wall of the container 100.

First and second flat conductors 120, 122 lying parallel to each other are held against the respective support plates 102a, 102b through respective insulating plates 118a, 118b interposed therebetween. The first and second conductors 120, 122 have disc regions 124a, 124b, respectively, and connector regions 126a, 126b, respectively, with first and second inner joint conductors 128a, 128b having ends embedded in the respective disc regions 124a, 124b. The first inner conductor 128a extends through the support plate 104a and the hollow space in the core 60 in insulated relation thereto, and engages the support plate 104b, thus electrically connecting the first conductor 120 and the support plate 104b to each other. Likewise, the second inner conductor 128b extends through the support plate 104b and the hollow space in the core 60 in insulated relation thereto, and engages the support plate 104a, thus electrically connecting the second conductor 122 and the support plate 104a to each other.

The first and second conductors 120, 122 have inlet passages 130a, 130b and outlet passages 132a, 132b communicating with the inlet ports 108a, 108b and the outlet ports 110a, 110b, respectively, in the container 100. The inlet passages 130a, 130b and the outlet passages 132a, 132b open outwardly from the connector regions 126a, 126b, and nipples 134a, 134b, 136a, 136b (FIGS. 6 and 8) are attached to the open ends of the inlet passages 130a, 130b and the outlet passages 132a, 132b. To these nipples 134a, 134b, 136a 136b, there are connected pipes 138a, 138b, 140a, 140b extending from the coolant supply source (not shown).

The container 100 has a hollow space 100a defined therein and filled with insulating oil 141.

Figure 8:
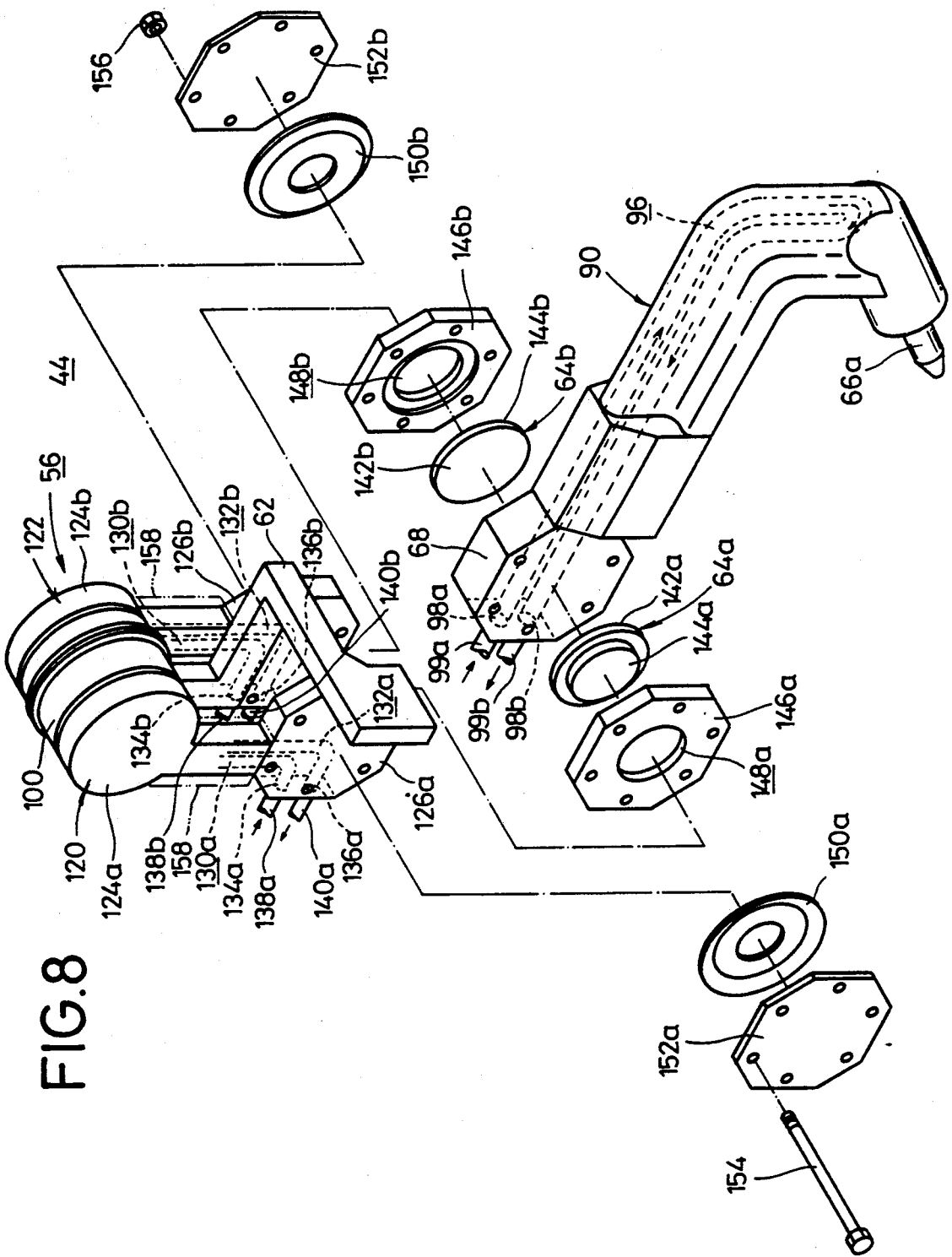
FIG. 8 is an exploded perspective view of the transformer.
Figure 9:
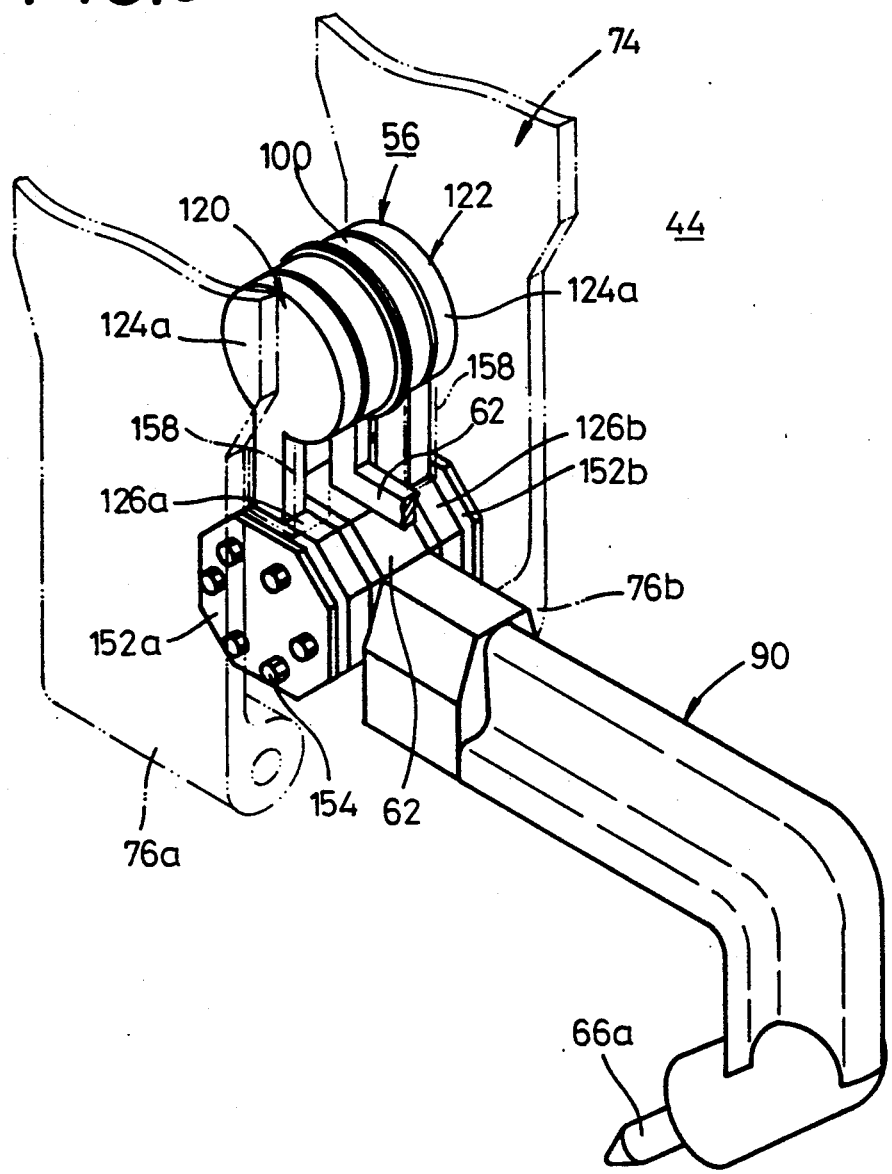
FIG. 9 is a perspective view of the transformer.

As shown in FIGS. 8 and 9, the transformer 56 is fixed to the output terminal 68 of the fixed gun arm 90 through the rectifiers 64a, 64b. More specifically, the rectifiers 64a, 64b have respective anodes 142a, 142b held directly against the opposite sides of the output terminal 68 of the fixed gun arm 90, and respective cathodes 144a, 144b engaging the connector regions 126a, 126b of the first and second conductors 120, 122 extending from the transformer 56. Insulating plates 146a, 146b are interposed between the output terminal 68 and the connector regions 126a, 126b and have respective openings 148a, 148b in which the rectifiers 64a, 64b are disposed.

Presser plates 152a, 152b are held against the outer surfaces, respectively, of the connector regions 126a 126b with disc springs 150a, 150b interposed therebetween. A plurality of bolts 154 are inserted through the presser plates 152a, 152b, the connector regions 126a, 126b, the insulating pates 146a, 146b, and the output terminal 68, and nuts 156 are threaded over the threaded ends of the bolts 154, thereby mounting the transformer 56 on the fixed gun arm 90 through the rectifiers 64a, 64b.

If necessary, reinforcing members 158 made of an electrically insulating resin material are integrally attached to the respective connector regions 126a, 126b. The transformer 56 can be held more securely by the connector regions 126a, 126b and the reinforcing members 158.

As shown in FIGS. 5 through 7, the cylinder 160 of the assembly 78 is disposed between the holder plates 80a, 80b and has a piston rod 162 extending toward the holder plate 80a. A movable gun arm 164 is securely fixed to the piston rod 162. The welding electrode 66b is mounted on the distal end of the movable gun arm 164 in confronting relation to the other welding electrode 66a. The movable gun arm 164 has a coolant passage 166 defined therein and opposite outwardly open ends to which respective nipples 168a, 168b are attached.

An electric feeder 170 has one end connected to the movable gun arm 164. A flexible copper plate 172 has opposite ends joined to the other end of the electric feeder 170 and the center tap 62. A tubular insulating member 174 is disposed in the electric feeder 170, and the guide bar 84a extends through the tubular insulating member 174.

The resistance welding apparatus of the present invention is basically constructed as described above. Operation and advantages of the resistance welding apparatus will be described below.

The areas of the two workpieces Wa, Wb to be welded together are superposed one on the other, and the welding robot (not shown) is operated to cause the robot arm 72 to move the welding electrodes 66a, 66b to the superposed areas of the workpieces Wa, Wb. At this time, the welding electrodes 66a, 66b are spaced from each other by a distance corresponding to the combined thickness of the workpieces Wa, Wb. When the welding electrodes 66a, 66b have reached the areas of the workpieces Wa, Wb to be welded, the cylinder 160 is operated to displace the piston rod 162 toward the workpiece Wb until the welding electrode 66b mounted on the movable gun arm 164 fixed to the piston rod 162 engages the workpiece Wb.

The cylinder 160 is further operated, but the piston rod 162 is prevented from being displaced since the welding electrode 66b is held against the workpiece Wb. Therefore, the assembly 78 floatingly supported by the bracket 74 is moved in a direction away from the workpiece Wb against the resilient forces of the coil springs 86a into the position indicated by the two-dot-and-dash lines in FIG. 6. Since the fixed gun arm 90 is fixed to the assembly 78 through the attachment 82 of the holder plate 80a, the assembly 78 and the fixed gun arm 90 are displaced in unison with each other away from the workpiece Wb. Thus, the other welding electrode 66a attached to the distal end of the fixed gun arm 90 is brought into engagement with the other workpiece Wa. The welding electrodes 66a, 66b now clamp the workpieces Wa, Wb therebetween under a predetermined force.

A primary power supply switch (not shown) of the resistance welding apparatus 30 shown in FIG. 4 is turned on, and at the same time the coolant supply source (not shown) is operated to supply a coolant such as cooling water through the inlet passages 130a, 130b into the inlet ports 108a, 108b and the passageways 106a, 106b and also into the passages 96, 166 in the fixed and movable gun arms 90, 164.

Three-phase AC electric power supplied from the three-phase AC power supply 46 shown in FIG. 4 is converted to DC electric power by the rectifier stack 48 of the converter unit 40, and the DC electric power is applied to the inverter unit 42. The bases of the transistors 52a through 52d connected in the full bridge configuration of the inverter unit 42 are supplied with pulse-width-modulated drive pulses from a base driver circuit (not shown) for enabling the inverter unit 42 to generate AC electric power of a higher frequency, e.g., of 10 KHz, than the commercial frequency of the three-phase AC power supply 46. The generated AC electric power is then applied through the output terminals 54a, 54b and the lead-out wires 57a, 57b to the primary winding 58 of the transformer 56. More specifically, as shown in FIGS. 10 and 12, the high-frequency AC electric power from the inverter unit 42 is applied to the primary winding 58 which is wound as a predetermined number of turns around the toroidal core 60. The high-frequency AC electric power supplied to the primary winding 58 then generates alternating interlinked fluxes $\phi$ which surround rectangular cross-sectional shapes provided by the core 60.

The interlinked fluxes $\phi$ induce a secondary voltage across the secondary windings 62a, 62b which are provided by the first and second inner conductors 128a, 128b and the container 100 including the support plates 104a, 104b. The induced voltage is transmitted to the first and second conductors 120, 122 through the first and second inner conductors 128a, 128b. The AC electric power transmitted to the first and second conductors 120, 122 is then rectified by the single-phase full-wave rectifying circuit composed of the rectifiers 64a, 64b. The rectified current is then supplied through the output terminal 68 and the center tap 62 between the welding electrodes 66a, 66b by which the workpieces Wa, Wb are clamped. The areas of the workpieces Wa Wb which are held in contact with each other are fused and joined to each other.

After the desired areas of the workpieces Wa, Wb have been welded to each other, the cylinder 160 is operated to displace the piston rod 162 back into the cylinder 160.

The welding electrodes 66a, 66b are now moved away from the workpieces Wa, Wb. Then, the robot arm 72 is actuated to move the welding electrodes 66a, 66b toward next areas of the workpieces Wa, Wb which are to be welded together.

With this embodiment, the transformer 56 is electrically connected to the fixed gun arm 90 through the first and second conductors 120, 122 which are connected to the secondary windings 62a, 62b and extend out of the container 100. The thin output terminal 68 is attached to the end of the fixed gun arm 90, and the anodes 142a, 142b of the rectifiers 64a, 64b are held against the opposite sides of the output terminal 68. The first and second conductors 120, 122 are held in engagement with the cathodes 144a, 144b of the rectifiers 64a, 64b. The output terminal 68, the rectifiers 64a, 64b, and the first and second conductors 120, 122 are securely put together by the bolts 154 and the nuts 156 as shown in FIG. 9.

The above arrangement largely reduces the contact resistance between the transformer 56 and the fixed gun arm 90, and hence any electric power loss therebetween. Accordingly, efficient welding operation can be achieved by the welding electrodes 66a, 66b.

Furthermore, the transformer 56 is held with respect to the fixed gun arm 90 virtually by the first and second conductors 120, 122. Therefore, any holders which have heretofore been dedicated to the transformer are not required. As a result, the number of parts used is reduced, and the resistance welding apparatus 30 is reduced in size and weight. The load on the robot arm 72 is thus reduced, and the resistance welding apparatus 30 can be moved quickly through the robot arm 72, with the consequence that the welding operation effected by the resistance welding apparatus 30 is made efficient.

The first and second conductors 120, 122 are associated, if necessary, with the reinforcing members 158 of an insulating resin material. The transformer 56 can thus be held more firmly with respect to the fixed gun arm 90, and no unwanted electric power loss is caused because the reinforcing members 158 are electrically insulating.

The output terminal 68 is disposed on the end of the fixed gun arm 90, and the rectifiers 64a, 64b have ends held in direct engagement with the output terminal 68 and the other ends engaging the first and second conductors 120, 122 extending from the transformer 56. Inasmuch as the rectifiers 64a, 64b are directly coupled to the fixed gun arm 90, it is not necessary to place any conductive plates and flexible copper plates between the rectifiers 64a, 64b and the fixed gun arm 90. As a consequence, the number of electric contacts between the transformer 56 and the fixed gun arm 90 is reduced, and the contact resistance is greatly reduced accordingly. When a large welding current is supplied to the welding electrodes 66a, 66b, the electric power loss is minimized for efficient welding operation.

With the arrangement of the present invention, the output terminal 68 is disposed on the end of the fixed gun arm 90, the rectifiers 64a, 64b directly engage the output terminal 68, and the the output terminal 68 defines therein the passage 96 extending near the welding electrode 66a. By supplying a coolant such as cooling water to the passage 96 through the pipe 99a, the cooling water cools the welding electrode 66a and the rectifiers 64a, 64b simultaneously, and thereafter is discharged out of the passage 96 through the pipe 99b. Therefore, the resistance welding apparatus 30 is reduced in size and weight as a whole as compared with the conventional resistance welding apparatus which employ dedicated cooling means for cooling the welding electrodes and the rectifiers. The cooling arrangement of the invention is quite simple since only the passage 96 for passing the cooling water therethrough is provided as a cooling means.

The first and second conductors 120, 122 which cooperate with the output terminal 68 in sandwiching the rectifiers 64a, 64b define therein the inlet passages 130a130b and the outlet passages 132a, 132b. When the cooling water is supplied from the pipes 140a, 140b to the inlet passages 130a, 130b, the interior of the transformer 56 and the rectifiers 64a, 64b are cooled by the supplied cooling water. The rectifiers 64a, 64b are thus prevented reliably from being adversely affected by heat.

The heat of iron loss and copper loss produced by the primary winding 58, the core 60, the rectifiers 64a, 64b, and those parts which constitute the secondary windings, such as the first and second inner conductors 128a, 128b, i.e., the heat generated in the container 100, is effectively radiated through the insulating oil 141 and the container 100 into the cooling water flowing through the passageways 106a, 106b.

With the present invention, as described above, the conductors extending from the secondary windings of the transformer are coupled to one of the gun arms directly or through the rectifiers, and the transformer is held on said one gun arm through the conductors. Accordingly, the electric power loss between the transformer and said one gun arm can be reduced as much as possible. Since the transformer is held by one of the gun arms, no dedicated transformer holders are necessary, and the resistance welding apparatus is reduced in weight and size.

In addition, because the rectifiers connected to the secondary windings of the transformer are directly coupled to the gun arm, no flexible copper plates are required for electric connection therebetween, and the contact resistance between the transformer and the gun arm is reduced to a large degree. The electric power loss which would otherwise be caused by the flexible copper plates and the contact resistance is therefore eliminated or minimized, and hence highly efficient welding operation is rendered possible especially when a large welding current is supplied between the electrodes for welding workpieces.

The rectifiers are held in direct engagement with one of the gun arms with the electrodes attached, and said one gun arm defines therein the coolant passage extending from a position near the electrodes to a position near the rectifiers. By supplying a coolant such as cooling water, thus, the electrodes and the rectifiers can simultaneously be cooled. As a result, the resistance welding apparatus is small and light in its entirety, and is also highly efficient in operation.

The secondary windings which double as the transformer container have the center tap, and the flat rectifiers are securely fixed to the secondary windings. Therefore, the number of the rectifiers used is reduced to half the number of rectifiers connected in a single-phase full-wave bridge rectifier circuit. The core is made of an amorphous material for use with high-frequency AC electric power, and the transformer container is filled with insulating oil for heat exchange with the exterior of the container. The core, the rectifiers, and the transformer can therefore be cooled efficiently, and the resistance welding apparatus is reduced in size. The cooling capability can further be increased by passing cooling water through the container, so that the resistance welding apparatus may further be reduced in size.

Although certain preferred embodiments have been shown and described, it should be understood that many changes and modifications may be made therein without departing from the scope of the appended claims.

What is claimed is:

1. A resistance welding apparatus comprising:
   a transformer having a secondary winding;
   a pair of gun arms supporting respective welding electrodes in confronting relation to each other and movable toward and away from each other;
   a conductor extending from said secondary winding and electrically connected to one of said welding electrodes through one of said gun arms, said conductor being joined with said one gun arm, said transformer being directly supported on said one gun arm;
   a robot arm having a bracket mounted thereon; and
   an actuator for displacing the other one of said gun arms with respect to said one gun arm;
   said transformer and said gun arms being combined as an assembly which is floatingly supported by said bracket.

2. The resistance welding apparatus according to claim 1, further including a rectifier having a terminal engaging said one gun arm and an opposite terminal engaging said conductor, said rectifier and said conductor being securely joined to said one gun arm.

3. The resistance welding apparatus according to claim 1 or 2, further including a reinforcing member of an electrically insulating material attached to said conductor, said transformer being supported on said one gun arm through said conductor and said reinforcing member.

4. The resistance welding apparatus according to claim 1, said pair of gun arms movable toward and away from each other along an axis extending longitudinally from the other one of said gun arms.

5. A resistance welding apparatus comprising:
   a transformer having a secondary winding;
   a plurality of rectifiers connected to said secondary winding; and
   a pair of gun arms supporting respective welding electrodes in confronting relation to each other and movable toward and away from each other, and said rectifiers being held in direct engagement with one of said gun arms.

6. The resistance welding apparatus according to claim 5, said rectifiers including first and second rectifiers having respective first terminals held against respective sides of said one gun arm, further including first and second conductors extending from said secondary winding and held against respective second opposite terminals of said first and second rectifiers, said first and second rectifiers and said first and second conductors being securely coupled to each other.

7. The resistance welding apparatus according to claim 5 or 6, further including a robot arm, a bracket mounted on said robot arm, an actuator for displacing the other one of said gun arms with respect to said one gun arm, said transformer and said gun arms being combined as an assembly which is floatingly supported by said bracket.

8. The resistance welding apparatus according to claim 5, said pair of gun arms movable toward and away from each other along an axis extending longitudinally from the other one of said gun arms.

9. A resistance welding apparatus comprising:
   a transformer having a secondary winding;
   a rectifier connected to said secondary winding;
   a pair of gun arms supporting respective welding electrodes in confronting relation to each other and movable toward and away from each other; and
   a first coolant passage, housed within one of said gun arms and extending near said welding electrode supported by said one gun arm and near said rectifier, for passing a coolant therethrough to cool said electrode and said rectifier,
   said rectifier being held in direct engagement with said one gun arm.

10. The resistance welding apparatus according to claim 9, further including a conductor extending from said secondary winding and held in direct engagement with said rectifier, said conductor having a second coolant passage housed therein for passing a coolant therethrough to cool the interior of said transformer and said rectifier.

11. The resistance welding apparatus according to claim 9, said pair of gun arms movable toward and away from each other along an axis extending longitudinally from the other one of said gun arms.

12. A resistance welding apparatus comprising:
    a pair of gun arms supporting respective welding electrodes in confronting relation to each other and movable toward and away from each other;
    a transformer having a hollow conductive container serving as a secondary winding, an annular core disposed in said container, and a primary winding mounted on said annular core;
    a rectifier having a first terminal held directly against said container;
    an output terminal extending from one of said gun arms and held directly against a second terminal of said rectifier; and
    a center tap mounted on an outer side wall of said container, a welding current is supplied from said output terminal and said center tap to workpieces to be welded to each other.

13. The resistance welding apparatus according to claim 12, said container is filled with insulating oil.

14. The resistance welding apparatus according to claim 12, said container has a coolant passage housed therein.

15. The resistance welding apparatus according to claim 12, said annular core is made of an amorphous material.

16. The resistance welding apparatus according to claim 12, said pair of gun arms movable toward and away from each other along an axis extending longitudinally from the other one of said gun arms.

17. A resistance welding apparatus comprising:

a transformer having a hollow conductive container serving as a secondary winding, an annular core disposed in said container, and a primary winding mounted on said annular core further comprising first and second inner conductors extending through an interior space of said annular core and electrically connected to said container, and first and second flat conductors extending parallel to each other exteriorly of said hollow conductive container, said first and second inner conductors having ends embedded in confronting surfaces of said first and second flat conductors, and extending in opposite directions;

first and second rectifiers having respective first terminals held directly against said first and second flat conductors, respectively; and an output terminal connected to respective second terminals of said first and second rectifiers, said container including a center tap mounted thereon, welding current being supplied from said output terminal and said center tap to workpieces to be welded to each other.

18. The resistance welding apparatus according to claim 17, said container is filled with insulating oil.

19. The resistance welding apparatus according to claim 17, said container has a coolant passage housed therein.

20. The resistance welding apparatus according to claim 17, said annular core is made of an amorphous material.

21. A resistance welding apparatus comprising:

first and second gun arms supporting respective welding electrodes in confronting relation to each other and movable toward and away form each other along an axis extending longitudinally from said first gun arm;

transformer means, having a secondary winding and mounted directly on said second gun arm, including respective first and second flat conductive members extending from opposite exterior portions therefrom and coupled to said secondary winding;

first and second rectifiers having respective first terminals respectively mounted directly against said first and second flat conductive members; and an output terminal mounted directly against respective second terminals of said first and second rectifiers, said transformer housed within a container which includes a center tap mounted thereon, welding current being supplied from said output terminal and said center tap to said respective welding electrodes for welding workpieces together.

22. The resistance welding apparatus of claim 21, said output terminal extending from said second gun arm.

23. The resistance welding apparatus of claim 22, said first and second rectifiers sandwiched between said output terminal and respective ones of said first and second flat conductive members.

24. The resistance welding apparatus of claim 23, each of said first and second rectifiers of disc shape including a first disc surface corresponding to a cathode and serving as said first terminal mounted directly against respective ones of said first and second flat conductive members, and a second opposing disc surface corresponding to an anode and serving as said second terminal mounted directly against respective opposing surfaces of said output terminal.

25. The resistance welding apparatus of claim 21, said first gun arm movable and said second gun arm mounted fixedly with respect to said first gun arm.

26. The resistance welding apparatus of claim 25, said second gun arm including a coolant passage housed therein for passing coolant for cooling said second gun arm and said respective welding electrode.

27. The resistance welding apparatus of claim 21, further comprising:

a robot arm;

a bracket mounted on said robot arm; and an actuator for displacing said first gun arm with respect to said second gun arm, said transformer means and said first and second gun arms combined as an assembly floatingly supported by said bracket.

* * * * *